United States Patent Office 3,642,795
Patented Feb. 15, 1972

3,642,795
TRIAZINYL-ANTHRAQUINONE DYESTUFFS
Paul Ulrich, Basel, Switzerland, assignor to
Ciba Limited, Basel, Switzerland
No Drawing. Filed Jan. 28, 1969, Ser. No. 794,765
Claims priority, application Switzerland, Feb. 19, 1968,
2,383/68; Nov. 19, 1968, 17,234/68
Int. Cl. C07d 55/20
U.S. Cl. 260—249         8 Claims

ABSTRACT OF THE DISCLOSURE

Dyestuffs of the formula

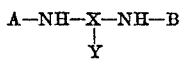

wherein A and B each represent a vattable residue, X represents a triazine or pyrimidine residue and Y represents a benzthiazole, benzoxazole or benzimidazole residue which is bound in the 2-position via an NH— group, a sulphur or oxygen atom to a ring carbon atom of the residue X, are valuable vat dyestuffs distinguished by good properties of wet fastness and very good properties of light fastness.

---

The present invention provides new dyestuffs of formula

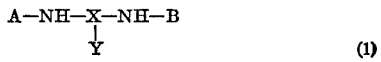       (1)

wherein A and B each denote a vattable residue, for example a residue of an anthraquinone or anthrone derivative, X denotes a triazine or pyrimidine residue and Y denotes a benzthiazole, benzoxazole or benzimidazole residue which is bound in the 2-position via an NH— group, a sulphur or an oxygen atom to a ring carbon atom of the residue X.

Dyestuffs of Formula 1 may be obtained by (a) condensing in any desired sequence, a triazine or pyrimidine which contains a replaceable substituent, preferably a trihalogenotriazine or trihalogenopyrimidine or tetrahalogenopyrimidine with two identical or different primary polycyclic aromatic amines of which the acylation products are vattable, and with a 2-amino, 2-mercapto or 2-hydroxy derivative of benzthiazole, benzoxazole or benzimidazole.

Dyestuffs of Formula 1 wherein Y denotes a 2-aminobenzthiazole, 2-aminobenzoxazole or 2-aminobenzimidazole residue can also be manufactured by (b) condensing in any desired sequence, an aminotriazine or aminopyrimidine with vattable polycyclic aromatic compounds that contain replaceable substituents, for example halogenanthraquinones or halogenanthrones, and with a benzthiazole, benzoxazole or benzimidazole which contains a replaceable substituent in the 2-position for example 2-chlorobenzthiazole. The manufacture can also be in part effected according to embodiment (a) and in part according to embodiment (b) when starting from a triazine or pyrimidine which contains amino groups and replaceable substituents differing therefrom, by replacing a removable substituent of the triazine or pyrimidine by an amino group before a condensation stage carried out in accordance with (b).

Dyestuffs of Formula 1 wherein Y denotes an —S— or —O— benzthiazole, -benzoxazole or -benzimidazole residue can as well as being manufactured according to embodiment (a) also be manufactured by a process which combines embodiments (a) and (b), by reacting a triazine or pyrimidine which contains a replaceable substituent for example a halogenotriazine, with a mercapto- or hydroxybenzthiazole, -benzoxazole or -benzimidazole in a molar ratio of 1:1 and after subsequent replacement of two removable substituents of the triazine or pyrimidine by amino groups, condensing with vattable polycyclic aromatic compounds that contain replaceable substituents for example halogenanthraquinones or halogenanthrones.

The concept of a vattable product encompasses those chromogenic substances which are converted by reduction to a so-called leuco-form or vat which has a better affinity for natural or regenerated cellulose fibres than the non-reduced form and which can be converted by oxidation back to the original chromophoric system. Thus no polycyclics quinones of the type of 1-amino-4-arylaminoanthraquinone-2-sulphonic acid are used in the present process because, whilst these can be reduced, they are chemically so extensively modified by the reduction that they can no longer be converted to the original chromophoric system.

The polycyclic aromatic primary amines to be used as starting substances for the manufacture of the dyestuffs of Formula 1 according to embodiment (a), of which the acylation products are vattable, may contain alkyl, acylamino or alkoxy groups and above all halogen atoms, preferably chlorine atoms, as substituents. As examples the following may be mentioned:

1-amino-2-chloranthraquinone,
1-amino-3-chloranthraquinone,
2-amino-3-chloranthraquinone,
1-amino-5-chloranthraquinone,
2-amino-4-chloranthraquinone,
1-amino-4-chloranthraquinone,
1-amino-6-chloranthraquinone,
1-amino-8-chloranthraquinone,
1-amino-3-chloro-6-methylanthraquinone,
1-amino-6,7-dichloranthraquinone,
1-amino-4-benzoylaminoanthraquinone,
1-amino-4-methoxyanthraquinone,
2-amino-3,4-phthaloylacridone,
1,4-diamino-2-acetylaminoanthraquinone,
aminoanthrapyrimidine,
1-aroylamino-4- or -5-aminoanthraquinone,
1,4-diamino-2-acetylanthraquinone,
1-amino-7-chloranthraquinone,
1-amino-2-methyl-3-chloranthraquinone, the compound

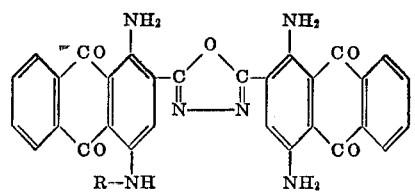    (2)

wherein R may be a benzoyl group or a hydrogen atom, amino-isothiazoleanthrones, amino-indanthrones, amino-dibenzanthrones, amino-isodibenzanthrones, amino-flavanthrones, 4 - aminoanthraquinone - 2,1(N)-acridones, aminoanthanthrone, and a compound of the formula

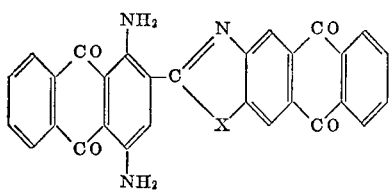

(3)

wherein X may be an oxygen atom or sulphur atom.

1-chloranthraquinone or 2,6-dichloranthraquinone are for example suitable for embodiment (b).

A benzthiazole or benzoxazole or benzimidazole to be used as staring material may be substituted at the benzene ring by alkyl, acyl or alkoxy groups, carbocyclic ring systems for example phenyl or cyclohexyl residues and above all halogen atoms, preferably chlorine atoms. The following may for example be used for embodiment (a): 2-amino-benzthiazole, 2-amino - 6 - chlorobenzthiazole, 2-amino-5-methylbenzthiazole, 2-amino-benzoxazole, 2-amino-benzimidazole, 2-mercapto-benzthiazole, 2-mercaptobenzoxazole, and 2-mercapto-benzimidazole.

The following are for example suitable for embodiment (b): 2,6-dichlorobenzthiazole, -oxazole or -imidazole, or 2-chloro-4-methylbenzthiazole, -oxazole or -imidazole.

Among the triazines or pyrimidines which possess replaceable substituents there may for example be mentioned, trichloro-1,3,5-triazine, tribromo-1,3,5-triazine and 2,4,6-trimethanesulphonyl-1,3,5-triazine.

The condensation reactions are advantageously carried out in an inert solvent and in the presence of an acid-binding reagent for example sodium carbonate, sodium acetate or particularly a tertiary amine, preferably pyridine. Since the third substituent of the triazine residue is relatively difficult to replace it is advantageous to work in a high-boiling solvent, for example nitrobenzene, o-dichlorobenzene, naphthalene or phenol. Reaction temperatures of above 100° are advantageously chosen. The replacement of the third substituent in the triazine ring can also be facilitated by adding small quantities of an aromatic sulphonic acid for example benzene sulphonic, p-toluene sulphonic or especially m-nitrobenzene sulphonic acid.

When starting from aminotriazines or aminopyrimidines and halogenanthraquinone and/or 2-halogenobenzthiazoles, -oxazoles or -imidazoles, an addition compound of a copper-I halide, especially copper-I iodide, and a tertiary base, especially a pyridine base, may be used as the catalyst for the condensation. The reaction preferably takes place in a high-boiling inert organic solvent, for example one of those mentioned above, at an elevated temperature, for example between 120 and 250° C.

The products obtained in accordance with the process of the invention are suitable for dyeing and printing the most diverse materials, especially for dyeing and printing fibres of natural and regenerated cellulose in the presence of reducing agents for example dithionite. The dyeings obtained are distinguished by good properties of wet fastness, especially fastness to soda boiling and to chlorine and also by very good light fastness properties. In contrast to the nearest comparable dyestuffs described in German published specification 1,149,476, the dyestuffs according to the invention are distinguished by better light fastness properties and more valuable greenish-tinged yellow colour shades.

The new dyestuffs can also be used as pigments. As a result of their favourable properties they can be employed for the most diverse pigment applications, for example in a finely divided form for dyeing rayon and viscose or cellulose ethers or esters or polyamides, polyurethanes or polyesters in the spinning composition, and also for the manufacture of coloured lacquers or lacquer-forming agents, solutions or products of acetylcellulose or nitrocellulose, natural resins or synthetic resins for example polymerisation resins or condensation resins, for example aminoplastics, alkyd resins, phenoplastics, polyolefines for example polyethylene, polypropylene, polystyrene, polyvinyl chloride or polyacylonitrile, rubber, casein, silicone and silicone resins. They can furthermore be advantageously used in the manufacture of crayons, cosmetic preparations or laminated sheets.

In the examples which follow the parts always denote parts by weight.

EXAMPLE 1

6.3 parts of the reaction product of 1 mol of cyanuric chloride with 2 mols of 1-amino-3-chloranthraquinone are heated to 205–210° C. in 60 parts of nitrobenzene together with 1.5 parts of 2-amino-benzthiazole in the presence of 1 part of pyridine. The reaction mixture is kept at this temperature for 6 hours and during the entire duration of the reaction a slight stream of nitrogen is passed through the mixture.

The mixture is cooled to about 100° C., and the dyestuff which has precipitated is filtered, washed with nitrobenzene and subsequently with methanol and dried in vacuo.

The isolated dyestuff of formula

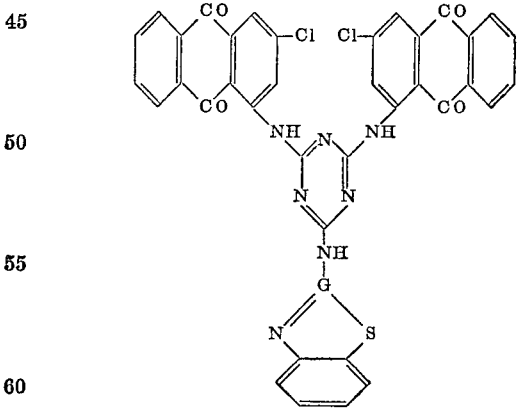

(4)

dyes cotton by the usual vat dyeing processes in greenish-tinged yellow shades having excellent fastness properties.

EXAMPLE 2

6.3 parts of the reaction product of 1 mol of cyanuric chloride with 2 mols of 1-amino-3-chloranthraquinone are heated to 205–210° C. together with 1.7 parts of 2- mercapto-benzthiazole in 60 parts of nitrobenzene in the presence of 0.3 part of pyridine.

The reaction mixture is kept for 2½ hours at this temperature and a slight stream of nitrogen is passed through the mixture throughout the duration of the reaction.

The mixture is cooled to about 100° C. and the dyestuff which has precipitated is filtered, washed with nitrobenzene and thereafter with methanol and dried in vacuo.

The isolated dyestuff of formula

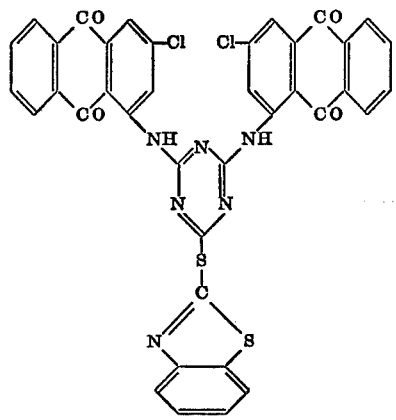

(5)

dyes cotton by the usual vat dyeing processes in greenish-tinged yellow shades having excellent fastness properties.

EXAMPLE 3

6.3 parts of the reaction product of 1 mol of cyanuric chloride with 2 mols of 1-amino-3-chloroanthraquinone are heated to the boiling point in 80 parts of nitrobenzene together with 1.5 parts of 2-mercapto-benzimidazole and 0.3 part of pyridine. The reaction mixture is kept at the boiling point for 3 hours whilst stirring and then cooled to 80–100° C. The product is filtered, washed with nitrobenzene and subsequently with methanol and dried in vaccuo.

The isolated dyestuff of formula

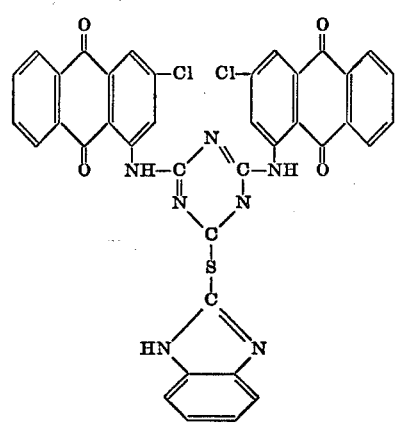

(6)

dyes cotton and viscose cellulose in greenish yellow shades by known vat dyeing processes.

Using the starting substances mentioned in the table which follows, further dyestuffs can be manufactured according to the processes of the invention and the shades obtained with these are given in the last column.

| Example | | |
|---|---|---|
| 4 | (anthraquinone-triazine-anthraquinone structure with C–Cl) | Golden yellow. (HO–C benzothiazole) |
| 5 | Same as above | Greenish yellow. (H₂N–C benzothiazole) |

| Example | | | |
|---|---|---|---|
| 6 | 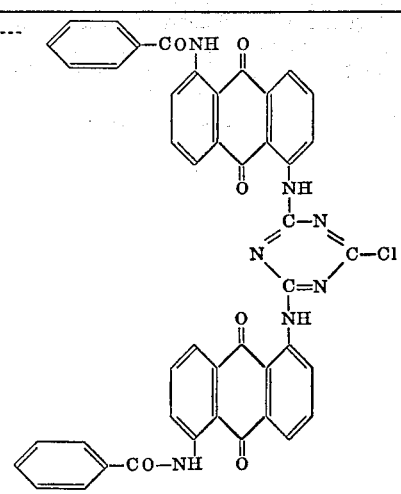 | 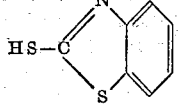 | Golden orange. |
| 7 | 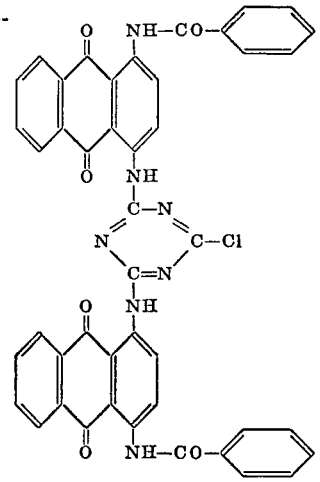 | 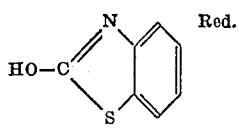 | Red. |
| 8 | 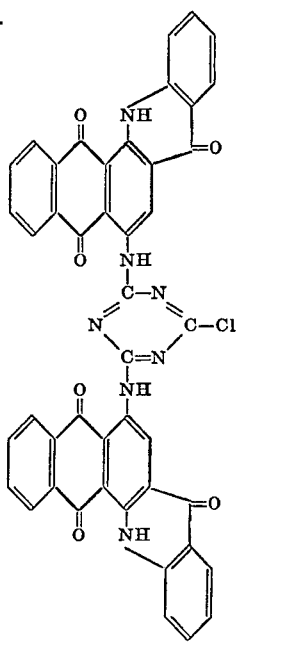 | 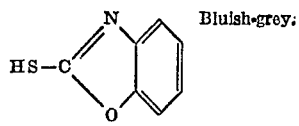 | Bluish-grey. |

| Example | | |
|---|---|---|
| 9 | 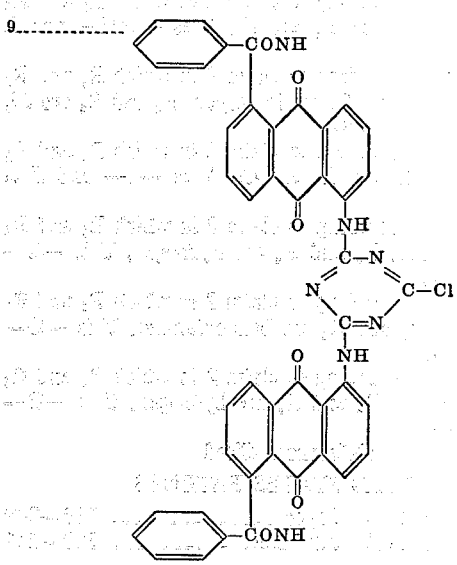 | 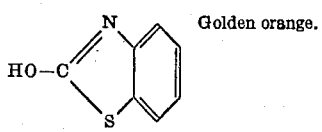 Golden orange. |
| 10 | 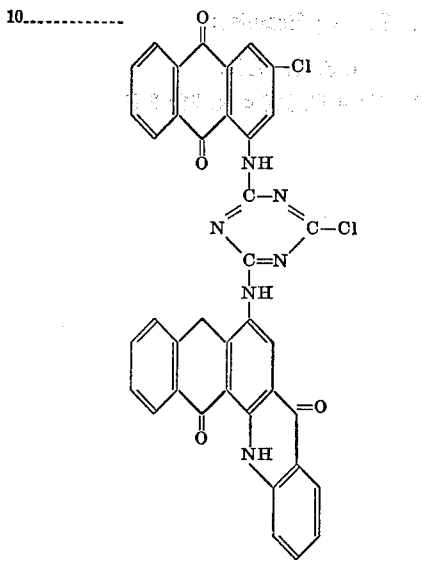 | 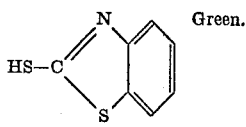 Green. |
| 11 | 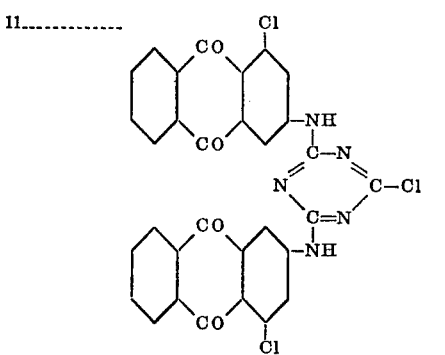 | 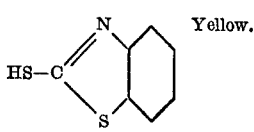 Yellow. |

Dyeing instruction 1 part of dyestuff is vatted with 10 parts by volume of sodium hydroxide solution (36° Bé.) and 5 parts of sodium hydrosulphite in 200 parts of water at 50–70° C. To a dyebath which contains 5 parts by volume of sodium hydroxide solution (36° Bé.) and 3.7 parts of sodium hydrosulphite in 2000 parts of water there is added the above stock vat solution and 100 parts of cotton are introduced at 40° C. After 10 minutes 15 parts of sodium chloride are added, a further 15 parts are added after 20 minutes, and dyeing is carried out at 40° C. for 45 minutes. After this the cotton is squeezed, oxidised and finished in the usual manner.

Pigment dyeing 5 parts of the dyestuff mentioned in Example 2 are mixed with 95 parts of dioctyl phthalate and ground in a ball mill until the pigment particles are smaller than 3μ.

0.8 part of this dioctyl phthalate paste are mixed with 13 parts of polyvinyl chloride, 7 parts of dioctyl phthalate and 0.1 part of cadmium stearate and thereafter milled for 5 minutes at 140° C. on a two roller mill.

A material which is coloured greenish-tinged yellow and has good migration fastness and good light fastness is obtained.

When instead of the above-mentioned dyestuff the dyestuff of Example 9 is used and the same procedure is followed in other respects, a material coloured in golden orange shades is obtained which has good migration fastness and light fastness properties.

I claim:
1. A dyestuff of the formula

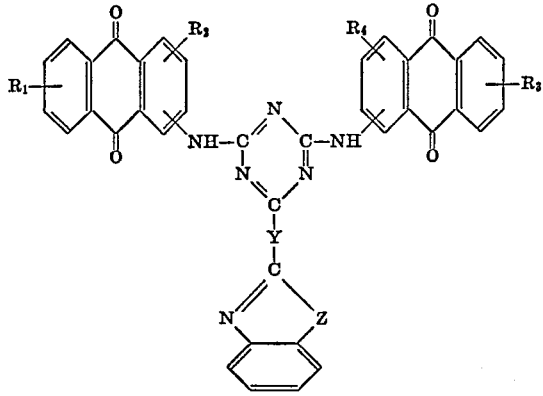

where $R_1$, $R_2$, $R_3$ and $R_4$ independently are hydrogen, halogen or benzoylamino, Y is —NH—, —S— or —O— and Z is —S—, —O— or —NH—.

2. A dyestuff according to claim 1 in which the anthraquinonyl residues are bound in the 1-position.

3. A dyestuff according to claim 2 in which $R_1$ and $R_3$ are hydrogen, $R_2$ and $R_4$ are Cl, Y is —NH— and Z is —S—.

4. A dyestuff according to claim 2 in which $R_1$ and $R_3$ are hydrogen, $R_2$ and $R_4$ are hydrogen, $R_2$ and $R_4$ are Cl, Y is —S— and Z is —S—.

5. A dyestuff according to claim 2 in which $R_1$ and $R_3$ are hydrogen, $R_2$ and $R_4$ are Cl, Y is —S— and Z is —NH—.

6. A dyestuff according to claim 2 in which $R_1$ and $R_3$ are benzoylamino, $R_2$ and $R_4$ are hydrogen, Y is —S— and Z is —S—.

7. A dyestuff according to claim 2 in which $R_1$ and $R_3$ are hydrogen, $R_2$ and $R_4$ are benzoylamino, Y is —O— and Z is —S—.

8. A dyestuff according to claim 2 in which $R_1$ and $R_3$ are benzoylamino, $R_2$ and $R_4$ are hydrogen, Y is —O— and Z is —S—.

References Cited

UNITED STATES PATENTS 2,813,863  11/1957  Joyce _____ 260—249
3,338,904  8/1967  Altermatt _____ 260—249

JOHN M. FORD, Primary Examiner

U.S. Cl. X.R.

8—36, 162; 260—256.4 C, 256.4 R, 256.5 R